(No Model.)
G. W. VEIL.
Ditching Machines.
No. 234,352. Patented Nov. 9, 1880.
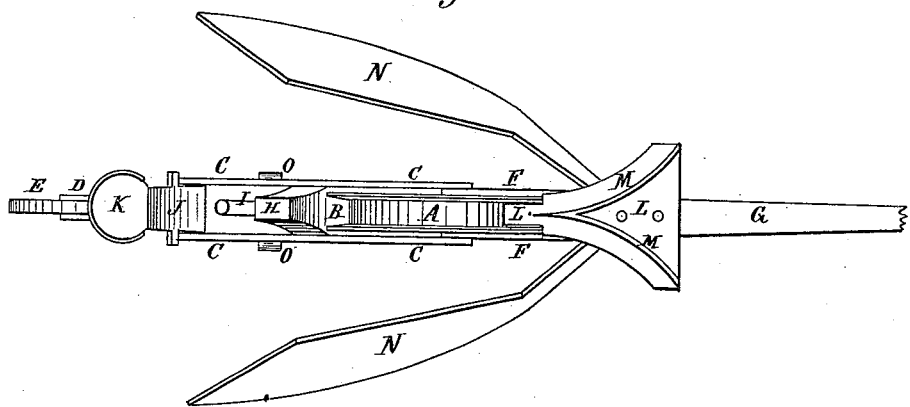
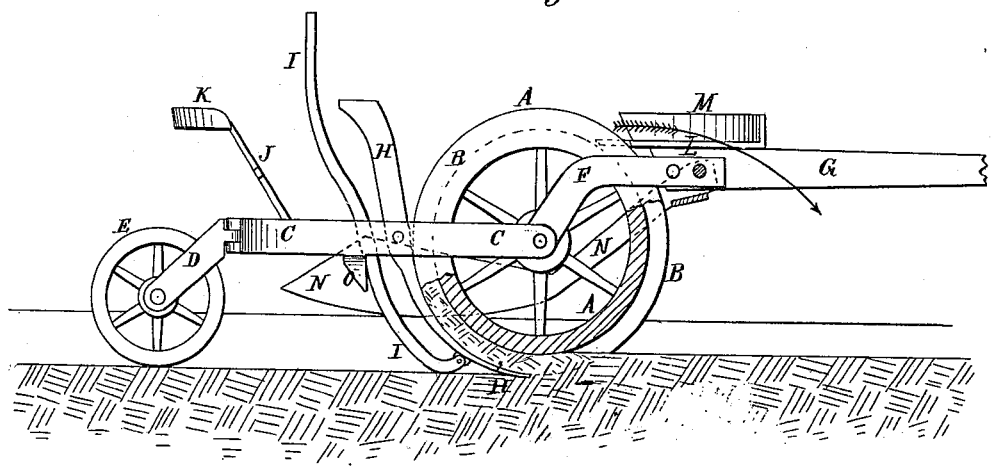
WITNESSES:
Henry N. Miller
C. Sedgwick
INVENTOR:
G. W. Veil
BY Munn & Co
ATTORNEYS.

# UNITED STATES PATENT OFFICE.

GEORGE W. VEIL, OF BUCYRUS, OHIO, ASSIGNOR OF ONE-HALF OF HIS RIGHT TO PHILIP BEACH, OF SAME PLACE.

DITCHING-MACHINE.

SPECIFICATION forming part of Letters Patent No. 234,352, dated November 9, 1880.

Application filed March 30, 1880. (No model.)

*To all whom it may concern:*

Be it known that I, GEORGE WASHINGTON VEIL, of Bucyrus, in the county of Crawford and State of Ohio, have invented a new and useful Improvement in Ditching and Grading Machines, of which the following is a specification.

Figure 1 is a plan view of the improvement. Fig. 2 is a side elevation, one of the wings being removed.

Similar letters of reference indicate corresponding parts.

The object of this invention is to furnish machines for opening and grading tile ditches, so constructed as to leave the bottom of the ditch straight and smooth.

The invention consists in constructing a ditching and grading machine of a frame, C F G, a caster-wheel, D E, a wheel, A, having flanges B at the sides of its rim to separate the soil to be removed from the soil at the sides of the ditch, a plow, H, to separate the soil to be removed from the soil at the bottom of the ditch, a lever, I, to control the plow, a flanged plate, L M, to discharge the soil, wings N to push the soil back from the sides of the ditch, and scrapers O to widen the ditch to receive the frame, as will be hereinafter fully described.

A represents the ditching-wheel, the rim of which has flanges B along its sides, forming a channel to receive the slice of soil and raise it above the surface of the ground. The flanges B are made with sharp edges, so that they may readily enter the ground and separate the soil to be removed from the soil at the sides of the ditch.

The journals of the wheel A revolve in bearings in the forward ends of two bars, C, to and between the rear ends of which is hinged or pivoted the standard D. The standard D is slotted or is made in two parts to receive the caster-wheel E, which is pivoted to the lower end of the said standard.

To the forward ends of the bars C, or to the journals of the ditching-wheel A, are pivoted the rear ends of two bars, F, which incline upward and forward, are bent forward, and have a tongue, G, attached to and between their forward ends. To and between the bars C, at the rear of the wheel A, is attached the plow or scoop H, by which the slice of soil to be removed is separated from the soil at the bottom of the ditch. The lower part of the plow H is curved to correspond with the curve of the rim of the wheel A, so that the said plow may serve also as a guard to keep the slice of soil in the channel between the flanges B while the said soil is being raised. The upper part of the plow H projects above the bars C, to serve as a stand to receive a spirit-level or other instrument to show the grade of the ditch.

Between the bars C, at the rear of the plow H, is placed a lever, I, the lower end of which is bent forward and upward, and is pivoted to the lower part of the plow H, so that the bend of the lever I may rest upon the bottom of the ditch and serve as a fulcrum, so that the said lever I may be used for raising the plow H to grade the ditch.

To and between the rear parts of the bars C is attached the lower end of the standard J, to the upper end of which is attached the driver's seat K, so that the driver, while sitting upon the seat K, can see the level or other grading-instrument placed upon the upper end of the plow H, and can operate the lever I to control the machine.

To the upper side of the rear part of the tongue G is attached a plate, L, the rear end of which is so formed as to fit into the channel between the flanges B of the wheel A and loosen the soil from the said channel. The forward part of the plate L is widened, and upon its upper side are secured flanges M, the rear ends of which meet at an acute angle. The forward parts of the flanges M are curved outward, as shown in Fig. 1.

With this construction the plate L and flanges M separate the soil from the wheel A, divide it into two parts, and guide it to the ground upon the opposite sides of the ditch.

To the bolts that secure the forward ends of the bars F to the rear end of the tongue G are pivoted the forward ends of the wings N, which incline outward, as shown in Fig. 1. The lower edges of the wings N rest upon the surface of the ground at the opposite sides of the ditch, so as to push back the soil as it falls from the plate L. The lower edges of the wings N are curved, as shown in Fig. 2, so that the said wings will operate properly however deep the ditch may be.

To the bars C in the rear of the plow H are attached scrapers O, to shave off the sides of the ditch to make room for the said bars C, so that the machine may move freely through the ditch as the said ditch increases in depth.

In using the machine it is drawn back and forth through the ditch until the ditch has been brought to the proper depth and grade.

Having thus described my invention, I claim as new and desire to secure by Letters Patent—

1. A ditching and grading machine constructed substantially as herein shown and described, consisting of the wheel A, having flanges B at the sides of its rim, the bars C F, the tongue G, the caster-wheel D E, the plow H, the lever I, the discharge-plate L, having flanges M, and the wings N, as set forth.

2. In a ditching and grading machine, the combination, with the frame C F G, the ditching-wheel A B, and the discharge-plate L M, of the pivoted wings N, substantially as herein shown and described, whereby the soil deposited upon the surface of the ground is pushed back from the sides of the ditch, as set forth.

3. In a ditching and grading machine, the combination, with the frame C F G, the caster-wheel D E, and the plow H, of the lever I, substantially as herein shown and described, whereby the plow H is controlled to grade the ditch, as set forth.

GEORGE WASHINGTON VEIL.

Witnesses:
  THEOD. F. SHOTWELL,
  JNO. A. EATON.